(12) United States Patent
Boduch et al.

(10) Patent No.: US 8,339,941 B2
(45) Date of Patent: Dec. 25, 2012

(54) METHODS AND APPARATUS FOR SELECTING THE BETTER CELL FROM REDUNDANT STREAMS WITHIN A CELL-ORIENTED ENVIRONMENT

(75) Inventors: Mark E. Boduch, Geneva, IL (US); Mark A. Richmond, Woodridge, IL (US); Lawrence D. Weizeorick, Lisle, IL (US)

(73) Assignee: Tellabs Operations, Inc., Lisle, IL (US)

( * ) Notice: Subject to any disclaimer, the term of this patent is extended or adjusted under 35 U.S.C. 154(b) by 1259 days.

(21) Appl. No.: 10/429,761

(22) Filed: May 5, 2003

(65) Prior Publication Data

US 2003/0231583 A1    Dec. 18, 2003

Related U.S. Application Data

(63) Continuation of application No. 09/501,930, filed on Feb. 10, 2000, now Pat. No. 6,667,954.

(51) Int. Cl.
*H04L 12/56* (2006.01)
*H04J 3/14* (2006.01)

(52) U.S. Cl. ............... 370/218; 370/220; 370/395.1

(58) Field of Classification Search ............... None
See application file for complete search history.

(56) References Cited

U.S. PATENT DOCUMENTS

| 5,072,440 A | 12/1991 | Isono et al. |
| 5,144,619 A | 9/1992 | Munter |
| 5,153,578 A | 10/1992 | Izawa et al. ............... 340/825.21 |
| 5,256,958 A | 10/1993 | Eng |
| 5,274,633 A | 12/1993 | Kato et al. |
| 5,285,441 A * | 2/1994 | Bansal et al. .............. 370/218 |
| 5,414,696 A * | 5/1995 | Tsuzuki et al. ............ 370/219 |
| 5,430,720 A * | 7/1995 | Larsson et al. ............ 370/399 |
| 5,436,886 A | 7/1995 | McGill |
| 5,450,397 A | 9/1995 | Wahlman .................. 370/60 |
| 5,485,453 A * | 1/1996 | Wahlman et al. .......... 370/389 |
| 5,561,661 A | 10/1996 | Edmaier et al. |
| 5,621,722 A | 4/1997 | Edmaier et al. |
| 5,631,896 A * | 5/1997 | Kawase et al. ............. 370/228 |

(Continued)

FOREIGN PATENT DOCUMENTS

| EP | 0961442 | 12/1999 |
| FR | WO99/20076 | * 4/1999 |
| WO | WO 98/29990 A | 7/1998 |
| WO | WO 99/09784 | 2/1999 |
| WO | WO 01/59978 A2 | 8/2001 |

OTHER PUBLICATIONS

Rathgeb, Erwin P., "The MainStreetXpress 36190: a Scalable and Highly Reliable ATM Core Services Switch," *Computer Networks* 31:583-601 (1999).

(Continued)

*Primary Examiner* — Chi Pham
*Assistant Examiner* — Soon-Dong D Hyun
(74) *Attorney, Agent, or Firm* — Hamilton, Brook, Smith & Reynolds, P.C.

(57) ABSTRACT

The specification discloses methods and apparatus for selecting the better of two or more copies of a cell in a cell-oriented redundant switching system connected to an external communications network. In the preferred embodiment, the best cell copy selection aligns redundantly transmitted cell streams before selecting cells for insertion in the data stream. Because the streams are aligned before the selection is made, the best cell copy selector compares each cell at the same instant in time, rather than basing its selection on past events.

26 Claims, 5 Drawing Sheets

U.S. PATENT DOCUMENTS

| | | | | |
|---|---|---|---|---|
| 5,737,338 A * | 4/1998 | Eguchi et al. | | 714/716 |
| 5,754,527 A * | 5/1998 | Fujita | | 370/217 |
| 5,764,637 A | 6/1998 | Nishihara | | |
| 5,784,357 A | 7/1998 | Wolker et al. | | 370/218 |
| 5,953,337 A | 9/1999 | Almay | | |
| 6,167,041 A | 12/2000 | Afanador | | |
| 6,490,251 B2 * | 12/2002 | Yin et al. | | 370/236.1 |
| 6,611,942 B1 * | 8/2003 | Battistello et al. | | 714/821 |
| 6,667,954 B1 | 12/2003 | Richmond et al. | | |
| 7,065,037 B1 * | 6/2006 | Viswanathan et al. | | 370/217 |

OTHER PUBLICATIONS

International Search Report for Int'l Appl. No. PCT/US01/04324; Date Mailed: Aug. 22, 2001.

International Preliminary Examination Report for Int'l Appl. No. PCT/US01/04324; Date Mailed: May 17, 2002.

Extended European Search Report for European Appl. No. EP 08 00 8416.3, dated Jul. 4, 2008.

\* cited by examiner

METHODS AND APPARATUS FOR SELECTING THE BETTER CELL FROM REDUNDANT STREAMS WITHIN A CELL-ORIENTED ENVIRONMENT

CROSS-REFERENCE TO RELATED APPLICATIONS

This patent application is a continuation of Ser. No. 09/501,930, filed Feb. 10, 2000 now U.S. Pat. No. 6,667,954, entitled "Methods and Apparatus for Selecting the Better Cell from Redundant Streams Within a Cell-Oriented Environment." The entire teachings of the above application is incorporated herein by reference.

TECHNICAL FIELD

The present invention is directed to methods and apparatus for intelligently selecting between or among copies of a cell in a cell-oriented environment, such as for example in switching equipment used in an ATM (Asynchronous Transfer Mode) communication network.

STATEMENT REGARDING FEDERALLY SPONSORED RESEARCH OR DEVELOPMENT

Not applicable.

BACKGROUND OF THE INVENTION

The present invention relates generally to methods and apparatus for selecting between or among cell streams in a communication network. More particularly, the present invention relates generally to methods for selecting between two or more redundant or competing cell streams from a cell-oriented environment, such as for example in an ATM (Asynchronous Transfer Mode) cell-based redundant switching system, connected to an external communications network.

Switching equipment may be designed with various layers of redundancy, including redundancy in the switch network portion of the switch itself. A switch network which provides redundancy is comprised of two or more redundant switch network copies. Such a redundancy scheme provides a vehicle whereby the "better" (also sometimes characterized in the art as the "best") cell of two or more copies of a cell may be selected for insertion into the data stream. Providing at least two redundant or competing cell streams from which to choose the better cell, as determined based upon at least one measure of cell quality, ensures the integrity of the data and minimizes the number of cells that may be dropped as "bad." Because different paths can be used to route different copies of a cell to the same destination, typically a decision must be made as to which of the copies received at that destination shall be further communicated in the network.

One prior art solution for selecting between redundant cell streams involves the use of control cells to synchronize cell streams that are redundantly transmitted in a cell-based communication network. These control cells, which contain a continuously changing sequence number, are inserted at regular intervals into the redundant cell streams at the start of the path. The presence of these control cells is monitored at the end of the path for each of the cell streams. The selected stream is identified, but it is not passed on until the sequence number in the selected stream matches the sequence number in its corresponding redundant stream. However, the cells are only aligned after a control cell is received; no alignment takes place in the time interval between arrival of control cells. Thus, dropped cells can cause misalignment until the next control cell is received. Further, a cell is not selected to be sent on to the customer network based on cell quality, i.e., the "best" of the received cells is not necessarily the cell sent on to the customer. Instead, the basis for selection is the presence or absence of a matching sequence number in the control cells of the two streams.

One objective of the present invention is to intelligently select one of two or more copies of a cell. According to one aspect of the invention, this selection is made by aligning the cell streams prior to selecting the best cell.

Another objective of the present invention is to tolerate a limited delay between the arrival of both cell copies, as well as a varying degree of bit errors associated with each of the cell copies.

Another objective of the present invention is to provide glitchless copy switching in a cell-oriented environment.

Another objective of the present invention is to select the best cell copy despite bit errors or other problems which may occur on one or both copies of the cell stream as the cell stream propagates.

Another objective of the present invention is to select the best cell copy while reducing or minimizing the number of cells dropped and maintaining the ordered nature of the cell stream.

These and other objects of the invention are discussed in or will be apparent to those skilled in the art from the following detailed description of the invention.

SUMMARY OF THE INVENTION

The present invention relates to methods and apparatus for selecting the better of two or more copies of any given cell from the received cell streams, dropping the least number of cells, while maintaining the ordered nature of the cell stream. The two or more copies of a cell presented for selection originate from multiple redundant switch network copies. These cell copies move through a redundant switch network, where the best cell copy selection is made, and the selected cell copy is inserted into the data stream.

In the preferred embodiment, the cell streams are aligned prior to selecting which of the two or more cells to insert into the data stream. The corresponding cell streams from the multiple redundant switch network copies are aligned using a buffer. After the two or more streams are aligned, one of the cells is selected for insertion into the data stream, based on a direct comparison of the two or more cell copies. If a cell is missing from all of the multiple redundant switch network copies, idle filler bytes are used to compensate for the missing data. Because the streams are aligned before the copy selection is made, the cells can be compared to one another at the same instant in time to determine which cell should be sent on to the customer network.

These and other features of the present invention are discussed or are apparent in the following detailed description of the invention.

BRIEF DESCRIPTION OF THE DRAWINGS

The present invention is described herein with reference to the drawings wherein.

DETAILED DESCRIPTION OF THE INVENTION

A switching system in a communication network is often designed with a redundant switch network. This redundancy provides an alternate route over which traffic may be redirected in the event that the primary route is unavailable. This redundancy scheme also provides a vehicle where the "best" data may be selected for insertion into the outgoing data stream, thus ensuring data integrity and minimizing the amount of data that may be dropped as bad. When a communication network is cell-oriented, as it is in the case of an Asynchronous Transfer Mode (ATM) communication network, for example, data travels through the communication network as cells. These cells reside in cell streams. When the best cell can be selected from redundant cell streams and can be inserted into the outgoing data stream and sent on to a customer network, data integrity is ensured while the ordered nature of the cell stream is maintained.

Figure 1:
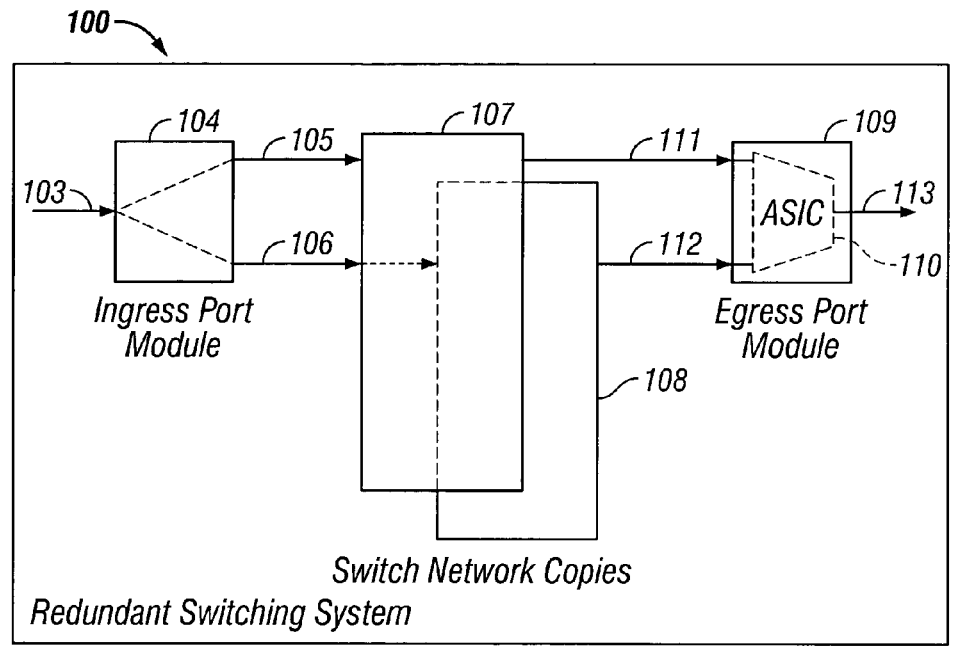
FIG. 1 is a diagram of a redundant switching system.

FIG. 1 depicts a redundant switching system 100 in which the best cell copy selection ASIC 110 may be employed. Such a redundant switching system 100 is connected to an external communications system. It is noted that although the discussion below proceeds with reference, in part, to SONET (Synchronous Optical NETwork) data, the invention is not limited to SONET data. The invention may be implemented with any cell-based data. Thus, the cells may encapsulate, for example, synchronous transfer mode (STM) data, ATM cells, or internet protocol (IP) packets.

Returning to FIG. 1, in the redundant switching system 100, there are two copies of a redundant switch network, switch network copy 107 and switch network copy 108. A signal 103 comes into the redundant switching system 100 to an ingress port module 104. Signal 103 may be a SONET stream consisting of multiple STS-N payloads. The ingress port module 104 splits the signal 103 into two identical signals, signal 105 and signal 106. Depending upon how a given port is configured, the ingress port module 104 may segment each of the STS-N payloads into cells (for the case of STM-type switching), or it may retrieve ATM cells from the payloads. In either case, signals 105, 106, 111, and 112 are characterized as composite cell streams, each of which may contain cells associated with multiple connections. Signal 105 and signal 106 are passed to redundant switch network copies 107 and 108, respectively. While two switch network copies provide redundancy, additional switch network copies (beyond two) may be used to provide additional redundancy. In that case, ingress port module 104 would split signal 103 into additional identical copies, one per switch network copy. For illustrative purposes, all the connections associated with signal 103 are assumed to be forwarded (switched) to the same egress port module. After signal 105 is input to switch network copy 107, the signal is routed through switch network copy 107 and output as signal 111. After signal 106 is input to switch network copy 108, the signal is routed through switch network copy 108 and output as signal 112. Signals 111 and 112 are then passed to the egress port module 109. The egress port module 109 determines whether signal 111 or signal 112 will be sent on to the customer's network as output signal 113.

The best cell copy selection ASIC (Application Specific Integrated Circuit) 110 resides in the egress port module 109. The inputs to the best cell copy selection ASIC 110 are composite cell streams, while the output of the best cell copy selection ASIC 110 is a data stream. The best cell copy selection is preferably performed by an ASIC, but can alternately be implemented by discrete hardware components or by software executing on a microprocessor.

Each cell stream has a unique identifier, hereinafter referred to as the source identification number. Cell streams are those which contain cells with only one source identification number; composite cell streams contain cells with multiple source identification numbers. The source identification number identifies the source of a given cell stream. Each cell stream is given a unique source identification number within an ingress port module 104. Egress port module 109 recognizes one or more cell streams based upon these source identification numbers. Each cell has a multi-bit sequence number which is attached at ingress port module 104 and which is identical for both copies of the same cell, and increasing for each subsequent cell entering the best cell copy selection ASIC 110 for any given source identification number. The sequence number identifies the position of the cell within the cell stream. A source identification number is associated with each cell stream source, and each cell stream source may assign sequence numbers independently.

The best cell copy selection ASIC 110 aligns the cell streams from the redundant switch network copies before selecting which one of the two cells to insert into the data stream. As noted above, although the discussion below proceeds with reference to SONET (Synchronous Optical NETwork) data, the invention is not limited to SONET data. If any cells required to construct the outgoing data stream are missing from both networks, the best cell copy selection ASIC 110 inserts idle filler bytes, consisting, for example, of alternating '1's and '0's, to compensate for the missing data. (The best cell copy selection ASIC 110 need only insert these filler bytes for applications in which STM-type switching, as previously defined, is used.) Because the streams are aligned before the copy selection is made, both cells can be compared to one another at the same instant in time, and the historical quality of the data streams need not be considered.

Figure 2:
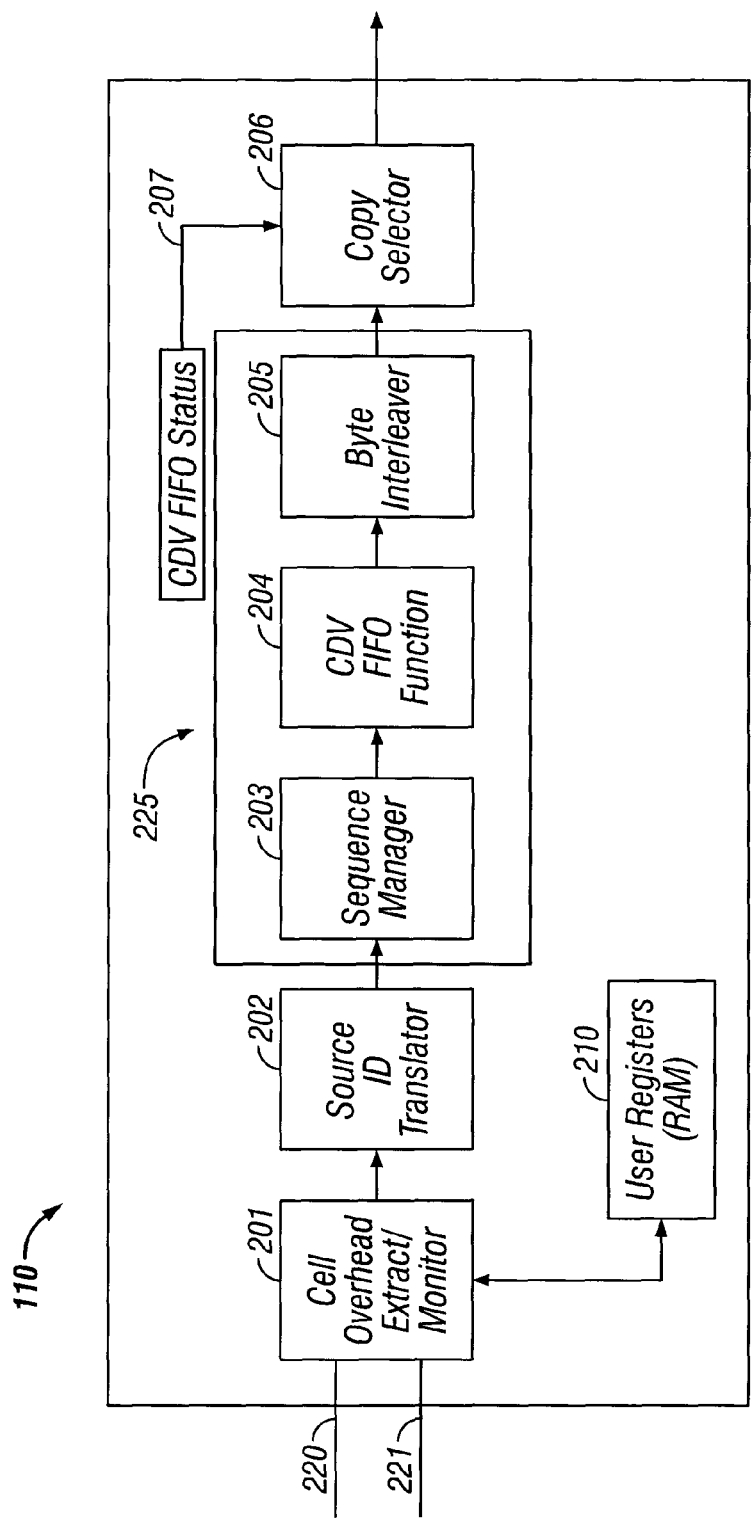
FIG. 2 is a block diagram of the cell stream alignment best cell copy selection ASIC.

FIG. 2 depicts a block diagram of the cell stream alignment best cell copy selection ASIC 110. Referring to FIG. 2, the best cell copy selection ASIC 110 includes a cell overhead extractor/monitor 201, a source ID translator 202, a sequence manager 203, a cell delay variation FIFO (CDV FIFO) function 204, a byte interleaver 205, and a copy selector 206. Although FIG. 2 shows the byte interleaver 205 occurring before the copy selecting, the byte interleaver 205 can alternately be performed after the copy selecting.

The cell overhead extractor/monitor 201 takes two received composite cell streams, composite cell stream 220 and composite cell stream 221, and extracts overhead status information from the fields of cell overhead that accompany each cell. Composite cell stream 220 originates from switch network copy 107 (shown in FIG. 1). Composite cell stream 221 originates from switch network copy 108 (shown in FIG. 1). The cell overhead extractor/monitor 201 extracts overhead status information from each stream emanating from each switch network copy. The cell overhead extractor/monitor 201 maintains the status of the extracted fields in user registers 210. The user registers 210, though shown in FIG. 2 as residing internal to the best cell copy selection ASIC 110, may alternately reside external to the best cell copy selection ASIC 110. One or more user registers may be associated with each source identification number and with each switch network copy. The cell overhead extractor/monitor 201 may also provide error counts for each stream emanating from each switch network copy. Information extracted by the cell overhead extractor/monitor 201 is passed to the source ID translator 202. Alternatively, the extracted information is stored in user registers 210 and accessed by the source ID translator 202.

As noted above, each cell stream has a source identification number, identifying the source of a given cell stream. The source identification number is one of the fields extracted by the cell overhead extractor/monitor 201.

The source ID translator 202 translates the source identification number (extracted by the cell overhead extractor/monitor 201) from the particular switch network copy into multiple signals for that switch network copy. The source ID translator 202 outputs a corresponding number of control signals per switch network copy. For example, for a synchronous transport signal, level 12 (STS-12), the source ID translator 202 outputs 12 control signals. These control signals indicate into which STS-1 the current cell is to be inserted.

The source ID translator 202 may also capture cell overhead information associated with any misrouted cell. A misrouted cell is a cell containing a source identification number which does not match one of the expected source identification numbers with which it is compared. For STS's, the source ID translator 202 performs this comparison by comparing the source identification number of each cell that arrives with as many as 24 expected source identification numbers. Because there are two source identification numbers for each outgoing stream, 24 expected source identification numbers are used in the comparison process. This minimizes the interruption of cell transmission for the case where the source of a given STS cell stream switches from one originating ingress port module 104 to another. If the incoming source identification number matches an expected source identification number, a bit corresponding to that expected source identification number is set by the source ID translator 202. The incoming cell is then forwarded to a corresponding STS CDV FIFO (discussed on subsequent pages).

The STS mapping 225 is comprised of the sequence manager 203, the CDV FIFO function 204, and the byte interleaver 205. The STS mapping 225 combines the individual incoming streams into one outgoing data stream.

The sequence manager 203 determines whether the cell stream is in sequence or out of sequence and provides the sequence number to the CDV FIFO function 204. The sequence manager 203 also ensures the validity and order of the data passed to the CDV FIFO function 204 by monitoring the sequence number within a single cell stream. The sequence number is used in conjunction with the source identification number to identify the cell stream and the cell order within that stream. The size or length of the sequence number is programmable and may be set to, for example, 8, 10, 12, or 14 bits in length via user register controls (not shown).

Figure 3:
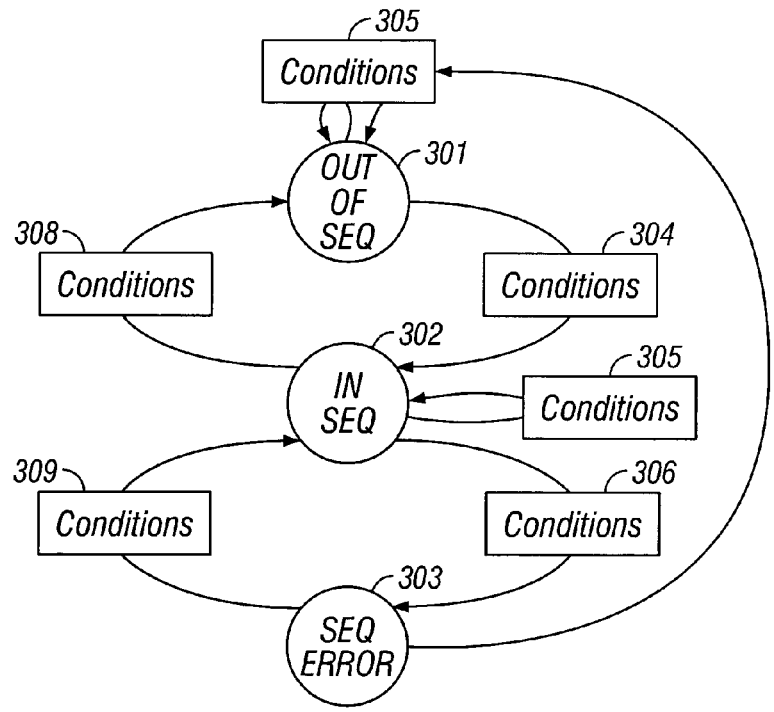
FIG. 3 is a state machine diagram for the sequence manager of the best cell copy selection ASIC.

The sequence manager 203 of FIG. 2 determines the sequence status of a particular cell stream. The method by which the sequence manager 203 determines whether a cell stream is in sequence or out of sequence may be implemented by the state machine shown in FIG. 3. Referring to FIG. 3, the sequence status may be in one of three states: out of sequence 301, in sequence 302, or sequence error 303. The sequence manager 203 evaluates the sequence number received from the current cell and compares it to the sequence number of the cell that was previously received. A composite cell stream error exists when errors which affect all cells within a composite cell stream (such as "loss of cell delineation") are detected. Composite cell stream errors are inputs to the state machine, the composite cell stream errors being determined by devices external to the best cell copy selection itself.

The sequence manager 203 initially starts in the in sequence state 302. Repeated execution of the state machine begins in the state of the previous cell. If the sequence manager 203 starts in the out of sequence state 301 (the last cell was out of sequence) and the conditions at block 304 exist, then the sequence manager 203 transitions the sequence state of that cell stream to the in sequence state 302. In particular, if the sequence manager 203 determines that the initialization bit in the cell overhead is not set (the initialization bit in the cell overhead is set at the ingress port module 104 in order to force initialization of the best cell circuitry associated with a given cell stream at the egress port module 109), and initialization has not been commanded by software (by means of setting a user register bit by a microprocessor), and no composite cell stream errors have occurred, and the sequence number is equal to the previous sequence number+1, then the sequence manager 203 transitions the sequence status to the in sequence state 302, writes the cell into the CDV FIFO, and updates the previous sequence number with the value of the sequence number of the current cell.

If the sequence manager 203 begins in the out of sequence state 301 and the conditions at block 305 exist, then the sequence manager 203 maintains the sequence status of that cell stream in the out of sequence state 301. In particular, if the sequence manager 203 determines that the sequence number is not equal to the previous sequence number+1, or the initialization bit in the cell overhead is set, or initialization has been commanded by software, or a composite cell stream error has occurred, then the sequence manager 203 maintains the sequence status in the out of sequence state 301, reports a loss of sequence in the CDV FIFO status 207, does not write the cell into CDV FIFO, and updates the previous sequence number with the value of the sequence number of the current cell.

If the sequence manager 203 begins in the in sequence state 302 (the initial execution of the state machine or the last cell was in sequence) and the conditions at block 306 exist, then the sequence manager 203 transitions the sequence state of that cell stream to the sequence error state 303. In particular, if the sequence manager 203 determines that the initialization bit in the cell overhead is not set, and initialization has not been commanded by software, and no composite cell stream errors have occurred, and the sequence number is not between the previous sequence number and the previous sequence+4, then the sequence manager 203 transitions the sequence status to sequence error 303 and does not write the cell into the CDV FIFO. Note that if the conditions at block 306 exist, the sequence manager 203 does not update the previous sequence number with the value of the sequence number of the current cell.

If the sequence manager 203 begins in the sequence state 302 and the conditions at block 307 exist, then the sequence manager 203 maintains the sequence state of that cell stream in the in sequence state 302. In particular, if the sequence manager 203 determines that the initialization bit in the cell overhead is not set, and initialization has not been commanded by software, and no composite cell stream errors have occurred, and the sequence number is between the previous sequence number and the previous sequence+4, then the sequence manager 203 maintains the sequence status in the in sequence state 302, writes the cell into the CDV FIFO, and updates the previous sequence number with the value of the sequence number of the current cell.

If the sequence manager 203 starts in the in sequence state 302 and the conditions at block 308 exist, then the sequence manager 203 transitions the sequence state of that cell stream to out of sequence 301. In particular, if the sequence manager 203 determines that the initialization bit in the cell overhead is set, or initialization has been commanded by software, or composite cell stream errors have occurred, then the sequence manager 203 transitions the sequence status to the out of sequence state 301, reports a loss of sequence, does not write the cell into the CFV FIFO, and updates the previous sequence number with the value of the sequence number of the current cell.

If the sequence manager 203 starts in the sequence error state 303 and the conditions at block 309 exist, then the sequence manager 203 transitions the sequence state of that cell stream to the in sequence state 302. In particular, if the sequence manager 203 determines that the initialization bit in the cell overhead is not set, and initialization has not been commanded by software, and no composite cell stream errors have occurred, and the sequence number is equal to the previous sequence number+1, then the sequence manager 203 transitions the sequence status to the in sequence state 302, writes the cell into the CDV FIFO, and updates the previous sequence number with the value of the sequence number of the current cell.

If the sequence manager 203 begins in the sequence error state 303 and the conditions at block 305 exist, then the sequence manager 203 transitions the sequence state of that cell stream to the out of sequence state 301. In particular, if the sequence manager 203 determines that the sequence number is not equal to the previous sequence number+1, or the initialization bit in the cell overhead is set, or initialization has been commanded by software, or composite cell stream errors have occurred, then the sequence manager 203 transitions the sequence status to the out of sequence state 301, reports a loss of sequence, does not write the cell into the CDV FIFO, and updates the previous sequence number with the value of the sequence number of the current cell.

Figure 4:
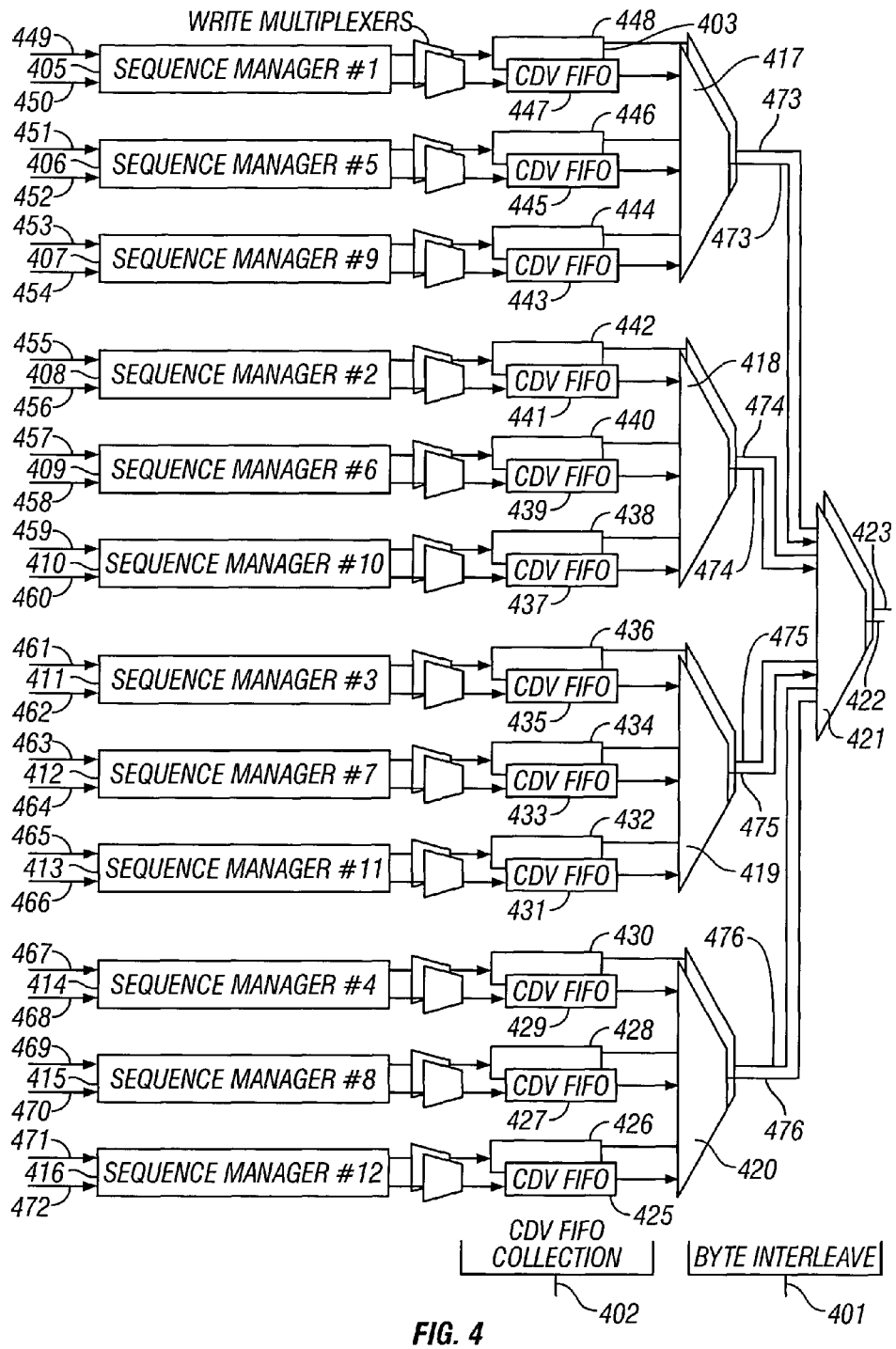
FIG. 4 is a block diagram of the sequence manager, the CDV FIFO, and the byte interleaving of the cell stream alignment best cell copy selection ASIC.

The sequence manager 203, the CDV FIFO function 204, and the byte interleaver 205 of FIG. 2 are further illustrated in FIG. 4. An STS-12 signal may consist of 12 STS-1s, a combination of STS-3cs and STS-1s, or an STS-12c. If an STS-12 signal is configured as 12 STS-1s, there is one sequence manager for each STS-1 stream pair. Stream 449 and stream 450 form one STS-1 stream pair, for example. In the case of an STS-12 signal configured as 12 STS-1s, sequence manager 405 is the sequence manager for the STS-1 stream pair formed by stream 449 and stream 450. If an STS-12 signal is configured as a combination of STS-3cs and STS-1s, there is one sequence manager for each STS-1 stream pair as before, and one sequence manager for each STS-3c stream pair. In the case of an STS-12 signal configured as a combination of STS-3cs and STS-1s, if streams 449-454 comprise an STS-3c stream pair, then sequence manager 405 is the sequence manager for the STS-3c stream pair formed by streams 449-454. For an STS-12c, only sequence manager 405 is used.

The CDV FIFO collection 402 may be a RAM (random access memory) or some other storage device which allows buffering of the cell streams. The CDV FIFO collection 402 consists of a series of parallel arrays, the size of each being dependent upon the number of cell streams. The CDV FIFO collection 402 of FIG. 4 consists of 24 CDV FIFOs 425-448, forming 12 CDV FIFO pairs. Here, the size of the CDV FIFO collection 402 is 2×12 by 8, or 24 parallel arrays with eight cell locations per array. For example, CDV FIFO 447 and CDV FIFO 448 form a CDV FIFO pair. For the remainder of this specification, when reference is made to a CDV FIFO pair, the CDV FIFO pair formed by CDV FIFO 447 and CDV FIFO 448 will be used to describe the CDV FIFO function 204. This description applies equally to any of the other CDV FIFO pairs illustrated in FIG. 4.

Each cell stream has associated with it a CDV FIFO. For example, for an STS-1, a CDV FIFO 447, eight cells deep, is used. The CDV FIFO 448 is associated with the redundant STS-1 stream. For an STS-3c, three CDV FIFO pairs are concatenated end-to-end to make two larger FIFOs capable of absorbing three times the cell delay variation. This is necessary because an STS-3c is three times the rate of an STS1; hence, three times the buffering capacity is required. Similarly, for an STS-12c, 12 CDV FIFO pairs are concatenated into two larger FIFOs (one for the STS-12c and a second for the redundant STS-12c) to absorb 12 times the delay variation. Combining multiple CDV FIFOs to create a large FIFO buffer allows the size to increase by a factor of three for an STS-3c, and by a factor of 12 for an STS-12c.

The CDV FIFO function 204 is used to absorb cell delay variation imparted by a single switch network. In addition, the CDV FIFO function 204 aligns the cells received from the multiple switch network copies before the copy selection decision is made. The CDV FIFO function 204 also performs clock rate conversion as necessary. Another function of the CDV FIFO is to serve as the reassembly buffer which enables the SONET stream reassembly function (for STM-type switching applications).

Cells may be received at non-regular intervals from the redundant switch network copies, or one or more cells may be dropped entirely. However, the CDV FIFO collection 402 must be able to absorb this delay variation in order to pass along cells at regular intervals.

The best cell copy selection ASIC 110 aligns the cell streams by writing the matching cells from the multiple redundant switch network copies (cells with the same source identification number and same sequence number) into corresponding CDV FIFO locations in two CDV FIFOs, CDV FIFO 447 and 448, one for each switch network copy. By writing the matching cells into corresponding CDV FIFO locations in CDV FIFOs 447 and 448, a read of CDV FIFO 447 and CDV FIFO 448 at the same location will result in cells with matching source identification and sequence numbers.

The switch network copy associated with one STS-1 of a given stream pair is referred to as the master switch network copy, while the switch network copy associated with the other STS-1 of the stream pair is referred to as the slave switch network copy. The CDV FIFO associated with the master switch network copy is referred to as the master CDV FIFO, while the CDV FIFO associated with the slave switch network copy is referred to as the slave CDV FIFO. There is both a write pointer and a read pointer associated with each CDV FIFO. The write pointer indicates the location within the CDV FIFO into which the next cell should be written, where the read pointer indicates the location within the CDV FIFO from which the next cell should be read. The slave CDV FIFO sets its write pointer value to the value of the master FIFO's write pointer plus the difference between the master's sequence number value and the slave's sequence number value.

Figure 5:
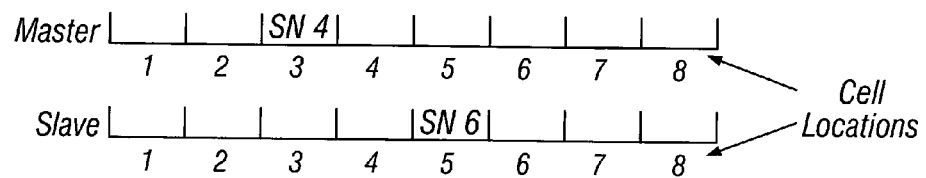
FIG. 5 is an illustration of the CDV FIFO cell stream alignment.

FIG. 5 provides an illustrative example of the alignment performed by the CDV FIFO function 204. If the master switch network copy writes sequence number 4 into cell location 3 (8 cell locations per CDV FIFO 447 and CDV FIFO 448), then if the slave receives sequence number 6, it will write it into cell location 3+(6−4)=5. For the master switch network copy, sequence number 5 will be written into cell location 4 and sequence number 6 will be written into cell location 5, which will match the slave's FIFO. In this way, if the best cell copy selection ASIC 110 reads the same location from both CDV FIFO 447 and CDV FIFO 448, the output cells will have the same sequence numbers, providing a cell was not dropped.

Because the same read pointer is used for CDV FIFO 447 and CDV FIFO 448 and because the read pointer is incremented at regular intervals as cells are needed for insertion into the data stream, either CDV FIFO 447 or 448 will be centered, while the other will be off-center by the amount of skew between the cell streams of either switch network copy. To center the CDV FIFO associated with one switch network copy in order to use it as a reference, one switch network copy is declared to be the master and that switch network copy's CDV FIFO (either CDV FIFO 447 or CDV FIFO 448) is centered. This centering operation interrupts the flow of data, and thus, might be performed only upon initialization. The other switch network copy (the slave) writes its data into its CDV FIFO (CDV FIFO 447 or CDV FIFO 448) relative to where the master is writing, so that when both streams are read out of CDV FIFO 447 and CDV FIFO 448, they will be aligned with one another.

To determine which switch network copy is the master, the CDV FIFO function 204 first determines which switch network copy is "bad." A switch network copy is bad if its sequence manager 405 is out of sequence, if the copy selection is forced to the other switch network copy, or if the switch network copy's CDV FIFO 447 and 448 is overflowed or underflowed. An overflow may occur if cells arrive at an average rate that is faster than the number of cells required to make up an STS-1 frame. An underflow may occur if cells arrive at an average rate slower than the number of cells required to make up an STS-1 frame. An overflow or underflow condition may exist, resulting in a switch network copy being marked as "bad," if the data rate into CDV FIFO 447 and/or CDV FIFO 448 is not equal to the data rate out of the CDV FIFO 447 and/or the CDV FIFO 448, respectively.

If only one switch network copy is bad, the bad switch network copy is the slave, and the other switch network copy is the master. If both switch network copies are bad or if both switch network copies are not bad, the title of "master" stays with the previous master switch network copy.

The CDV FIFO function 204 also provides a conversion from one clock rate to another. This conversion is required when the incoming cell payload is received by the CDV FIFO function 204 at one clock rate, but read out to the byte interleaver 205 at another clock rate.

The byte interleaver 205 determines which location is read from the CDV FIFO collection 402. The byte interleaver 205 also dictates in which order the CDV FIFOs 425-448 will be read to create byte-interleaved STS-12 signals 422 and 423.

The byte interleave 401 consists of four STS-3 multiplexers 417, 418, 419, and 420, and one STS-12 multiplexer 421. Each of the four STS-3 multiplexers 417-420 and the STS-12 multiplexer 421 is depicted in FIG. 4 as a pair of multiplexers to illustrate the redundant nature of the stream design. Hence, STS-3 multiplexer 417, for example, appears as a pair of multiplexers to accommodate multiple streams. Similarly, STS-3 multiplexers 418, 419, and 420 are depicted as multiplexer pairs. The STS-12 multiplexer 421 is also depicted as a pair of multiplexers. The STS-12 multiplexer outputs two redundant streams from which the best cell copy selection is made (by the copy selector 206).

FIG. 4 depicts 12 STS-1 signals 449-472 which are combined into four STS-3c signals 473-476 after being operated upon by the sequence manager 203 and the CDV FIFO function 204. The interleaving order depends on the configuration of the STS-12 signal. As mentioned previously, there are three possible configurations: an STS-12 (consisting of 12 STS-1 signals), an STS-12c, or any combination of STS-3cs and STS-1s. An STS-3c is made by combining three STS-1 streams. For example, STS-1 signals 449, 451, and 453 are combined into STS-3 or STS-3c signal 473 by STS-3 multiplexer 417. Similarly, STS-1 signals 450, 452, and 454 (redundant copies of STS-1 signals 449, 451, and 453) are combined into STS-3 or STS-3c signal 473 by STS-3 multiplexer 417. STS-1 signals 455, 457, and 459 are combined into STS-3 or STS-3c signal 474 at STS-3 multiplexer 418. STS-1 signals 461, 463, and 465 are combined into STS-3 or STS-3c signal 475 at STS-3 multiplexer 419. STS-1 signals 467, 469, and 471 are combined into STS-3 or STS-3c signal 476 at STS-3 multiplexer 420. The STS-3 or STS3c signals 473-476 from STS-3 multiplexers 417, 418, 419, and 420 respectively are combined into STS-12 signal 422 and STS-12 signal 423 by STS-12 multiplexer 421. Two identical STS-12 signals 422 and 423 are output by the STS-12 multiplexer 421. It is from these signals which the best cell copy selection is made.

After the individual streams are combined into one outgoing stream, and the stream and its corresponding redundant stream have been aligned, the best cell copy selection ASIC 110 invokes the copy selector 206 to select the better of the two copies of each cell to be sent on to the customer network. The term "better" refers to the cell that arrives at egress port module 109 of FIG. 1 with fewest errors, and the selection is made on a cell-by-cell basis. The better of the two cells is then inserted by the best cell copy selection ASIC 110 into the corresponding data stream. The copy selection is made as each cell is read from the CDV FIFO collection 402. Because the sequence number is used to write the cells into the CDV FIFO collection 402, reading the same location of each switch network copy's CDV FIFO collection 402 for a given STS signal yields cells from identical streams and with the same sequence number.

The copy selector 206 selects a cell from one of the redundant switch network copies. When a cell is not available from either switch network copy, the copy selector 206 inserts a filler cell to maintain the average data rate. The filler cell is generated by the best cell copy selection ASIC 110, and contains, for example, alternating '1's and '0's. The copy selector 206 reads the same location from each switch network copy's CDV FIFO collection 402. The copy selector 206 bases its cell selection on status information. This status information is read by the copy selector 206 from a CDV FIFO status 207. This status information includes information such as whether the FIFO cell location is occupied, whether the CDV FIFO collection 402 has overflowed or underflowed, and whether the given cell contains bit errors. If bit errors are detected within the non-overhead field of a received cell, then the cell's associated bit error status bit is set to TRUE.

Figure 6A:
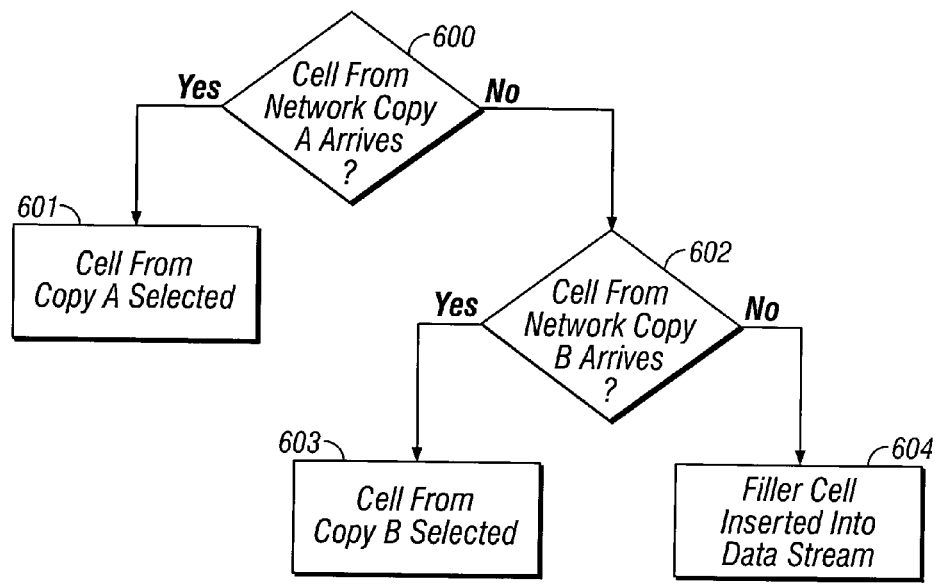
FIG. 6a is a flow chart illustrating the operation of the cell stream alignment best cell copy selection ASIC upon arrival of a single cell or no cell.
Figure 6B:
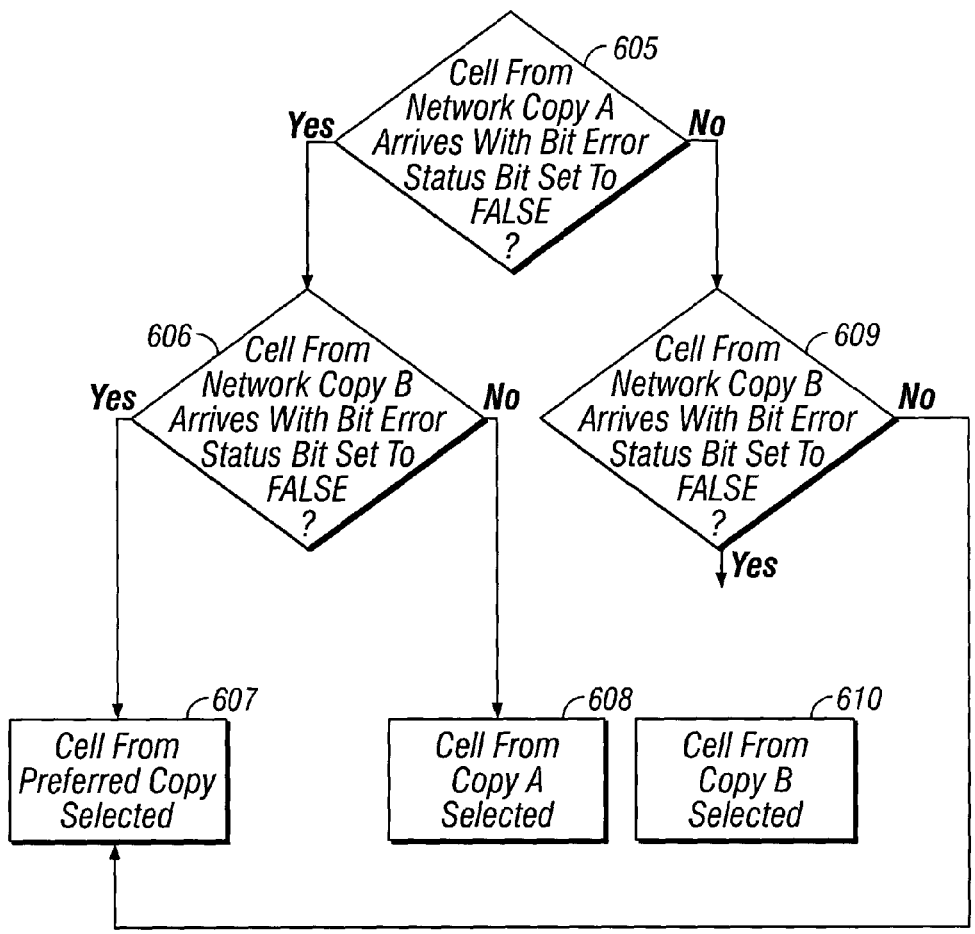
FIG. 6b is a flow chart illustrating the operation of the cell stream alignment best cell copy selection ASIC upon arrival of two cells.

A cell has "arrived" if its occupied flag is TRUE and its CDV FIFO collection 402 has not overflowed or underflowed. When a single cell arrives, it is selected. When two cells arrive (one from each switch network copy), a selection is made based on the status of a bit error status bit. FIGS. 6a and 6b depict the possible cell status combinations and the resulting copy selections based on the values of the various flags and the contents of the bit error status bit, where applicable.

FIG. 6a illustrates the cell selection strategy when the best cell copy selection ASIC 110 detects the arrival of a single cell or no cell. Referring to FIG. 6a, at block 600 the best cell copy selection ASIC 110 determines whether a cell has arrived from switch network copy A. If the best cell copy selection ASIC 110 determines that a cell has arrived from switch network copy A, the best cell copy selection ASIC 110 proceeds to block 601. At block 601, the best cell copy selection ASIC 110 sends the cell from switch network copy A on to the customer network.

If at block 600 the best cell copy selection ASIC 110 determines that a cell has not arrived from switch network copy A, the best cell copy selection ASIC 110 proceeds to block 602. At block 602, the best cell copy selection ASIC 110 determines whether a cell has arrived from switch network copy B. If the best cell copy selection ASIC 110 determines that a cell has arrived from switch network copy B, the best cell copy selection ASIC 110 proceeds to block 603. At block 603, the best cell copy selection ASIC 110 selects the cell that has arrived from switch network copy B to send on to the customer network.

If at block 602, the best cell copy selection ASIC 110 determines that a cell has not arrived from switch network copy B, the best cell copy selection ASIC 110 proceeds to block 604. At block 604, the best cell copy selection ASIC 110 inserts a filler cell (for example, alternating '1's and '0's) into the data stream sent to the customer network to compensate for the missing data.

FIG. 6b illustrates a cell selection strategy when the best cell copy selection ASIC 110 detects the arrival of two cells, one from switch network copy A and one from switch network copy B. Referring to FIG. 6b, at block 605 the best cell copy selection ASIC 110 determines whether a cell has arrived from switch network copy A with the bit error status bit set to FALSE. A bit error status bit set to FALSE indicates no error, whereas a bit error status bit set to TRUE indicates error. If the best cell copy selection ASIC 110 determines that a cell has arrived from switch network copy A with its bit error status bit set to FALSE, the best cell copy selection ASIC 110 proceeds to block 606. At block 606 the best cell copy selection ASIC 110 determines whether a cell has arrived from switch network copy B with its bit error status bit set to FALSE. If the best cell copy selection ASIC 110 determines that a cell has arrived from switch network copy B with its bit error status bit set to FALSE, the best cell copy selection ASIC 110 proceeds to block 607. At block 607, the best cell copy selection ASIC 110 sends the cell from the preferred switch network copy on to the customer network. The preferred switch network copy is the switch network copy from which the last cell was sent on to the customer network.

If at block 606 the best cell copy selection ASIC 110 determines that a cell has not arrived from switch network copy B with its bit error status bit set to FALSE, the best cell copy selection ASIC 110 proceeds to block 608. At block 608 the best cell copy selection ASIC 110 sends the cell from switch network copy A on to the customer network.

If at block 605 the best cell copy selection ASIC 110 determines that a cell has not arrived from switch network copy A with its bit error status bit set to FALSE, the best cell copy selection ASIC 110 proceeds to block 609. At block 609 the best cell copy selection ASIC 110 determines whether a cell arrived from switch network copy B with its bit error status bit set to FALSE. If the best cell copy selection ASIC 110 determines that a cell arrived from switch network copy B with its bit error status bit set to FALSE, the best cell copy selection ASIC 110 proceeds to block 610. At block 610, the best cell copy selection ASIC 110 sends the cell from switch network copy B on to the customer network.

If at block 609 the best cell copy selection ASIC 110 determines that a cell did not arrive from switch network copy B with its bit error status bit set to FALSE, the best cell copy selection ASIC 110 proceeds to block 607. At block 607, best cell copy selection ASIC 110 sends the cell from the preferred switch network copy on to the customer network.

The preferred embodiment of the present invention is described herein. It is to be understood, of course, that changes and modifications may be made in the above-described embodiment without departing from the true scope and spirit of the present invention as defined by the appended claims.

We claim:

1. A method for selecting a better cell from redundantly transmitted cell streams comprising:
   aligning the redundantly transmitted cell streams based on sequence numbers assigned to cells of the redundantly transmitted cell streams;
   performing a plurality of error verification procedures on first and second cells obtained from corresponding first and second cell streams; and
   selecting a better cell from between the first and second cells as a function of results of the plurality of error verification procedures.

2. The method of claim 1 wherein selecting a better cell from between the first and second cells includes selecting the cell with fewer errors.

3. The method of claim 1 wherein the first and second cell streams each include an asynchronous transfer mode cell.

4. The method of claim 1 wherein the first and second cell streams each include a synchronous transfer mode cell.

5. The method of claim 1 wherein the first and second cell streams each include an internet protocol packet.

6. The method of claim 1 wherein the method is performed by a network node.

7. The method of claim 1 wherein performing the plurality of error verification procedures includes determining in sequence or out of sequence cells in the first and second cell streams.

8. The method of claim 1 wherein performing the plurality of error verification procedures includes determining overflowed or underflowed cell streams.

9. The method of claim 1 wherein performing the plurality of error verification procedures includes determining whether a cell arrives within a cell stream.

10. The method of claim 1 wherein performing the plurality of error verification procedures includes determining whether a cell within a cell stream includes an error bit.

11. The method of claim 1 wherein performing the plurality of error verification procedures includes performing at least two error verification procedures.

12. The method of claim 1 wherein performing the plurality of error verification procedures includes performing at least three error verification procedures.

13. A method for selecting cells from redundant cell streams comprising:
   aligning the redundant cell streams based on sequence numbers assigned to cells of the redundant cell streams;
   selecting a first cell from a first cell stream if the first cell does not contain an error;
   selecting a corresponding second cell from a second cell stream if the corresponding second cell does not contain an error; and
   selecting from between one of the first cell or the corresponding second cell as a function of selecting a cell belonging to a preferred cell stream.

14. The method of claim 13 including wherein selecting from between one of the first cell or the corresponding second cell includes selecting the cell belonging to a cell stream most recently received via a customer network.

15. The method of claim 13 wherein the first cell and the corresponding second cell each comprises an asynchronous transfer mode cell.

16. The method of claim 13 wherein the first cell and the corresponding second cell each comprises a synchronous transfer mode cell.

17. The method of claim 13 wherein the first cell and the corresponding second cell each comprises an internet protocol packet.

18. A system for selecting cells from redundant cell streams comprising:
 a cell monitor to provide error counts resulting from performing a plurality of error verification procedures on first and second cells; and
 a copy selector to align the redundant cell streams based on sequence numbers assigned to cells of the redundant cell streams and to select a better cell from between the first and second cells as a function of results of the plurality of error verification procedures.

19. The system of claim 18 wherein the copy selector is arranged to select from between the first and second cells as a function of selecting a cell stream with fewer errors.

20. The method of claim 18 wherein the first and second cells include an asynchronous transfer mode cell.

21. The method of claim 18 wherein the first and second cells include a synchronous transfer mode cell.

22. The method of claim 18 wherein the first and second cells include an internet protocol packet.

23. A method for selecting cells from redundantly transmitted streams of cells comprising:
 aligning the redundantly transmitted cell streams based on sequence numbers assigned to cells of the redundantly transmitted cell streams;
 determining a first error status in a first cell in a first cell stream;
 determining a second error status in a corresponding second cell in a redundant second cell stream;
 comparing the first error status with the second error status; and
 selecting a better cell as a function of selecting from between one of the first cell or the corresponding second cell based upon the results of the comparing.

24. The method of claim 23 wherein the first and second error statuses are based on a plurality of error conditions in the first and second cell streams.

25. The method of claim 23 wherein the method is performed by an Application Specific Integrated Circuit (ASIC) at a network node.

26. A method for selecting a better cell from redundantly transmitted data streams comprising:
 aligning the redundantly transmitted cell streams based on sequence numbers assigned to cells of the redundantly transmitted cell streams;
 performing a plurality of error verification procedures on first and second cells obtained from corresponding first and second data streams; and
 selecting a better cell from between the first and second cells as a function of results of the plurality of error verification procedures.

* * * * *

UNITED STATES PATENT AND TRADEMARK OFFICE
CERTIFICATE OF CORRECTION

PATENT NO. : 8,339,941 B2  
APPLICATION NO. : 10/429761  
DATED : December 25, 2012  
INVENTOR(S) : Mark E. Boduch Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1386 days.

Signed and Sealed this
Sixteenth Day of December, 2014

Michelle K. Lee
*Deputy Director of the United States Patent and Trademark Office*